United States Patent Office 3,247,648
Patented Apr. 26, 1966

3,247,648
METHOD FOR HYDROGEN SEPARATION AND PURIFICATION
David L. McKinley, Nitro, W. Va., assignor to Union Carbide Corporation, a corporation of New York
No Drawing. Filed Mar. 11, 1963, Ser. No. 264,018
3 Claims. (Cl. 55—16)

The present invention relates to the separation and purification of hydrogen gas from multicomponent gas mixtures containing hydrogen and other gases, in accordance with gas permeation techniques and, more particularly, to a hydrogen separation method which comprehends the diffusion of hydrogen through a permeation barrier made from an alloy of palladium and silver.

It has long been known that certain selected component gases comprised in multicomponent gas mixtures can be separated out of the mixtures by directing respective streams of the mixtures against barriers which are permeable to a particular selected component gas but impermeable to other gases and collecting the respective selected component gases at the barrier sides opposite the sides against which the streams are directed. Such processes are performed most effectively at elevated temperatures. It is known that palladium is permeable to hydrogen and impermeable to other gases. Illustrative of the fundamental technique of hydrogen separation through palladium barriers is the teaching found in United States Patent No. 1,174,631 to Snelling. Thus, by directing a multicomponent gas stream including hydrogen against a thin sheet or film of palladium maintained at an elevated temperature, the hydrogen can be selectively separated and collected in a high purity state at the downstream side of the barrier.

High purity hydrogen in large quantities is required in many industrial chemical production processes and, presently, in national defense work. Procurement of high volume hydrogen supplies of adequate purity at reasonable cost has long been a matter of concern to industry. While not conclusively proven to date, the existing theory respecting the transfer of hydrogen by diffusion through these hydrogen-specific palladium barriers is that the molecular hydrogen, in whatever gas mixture applied to a palladium barrier surface, dissociates into atomic hydrogen upon contacting the palladium and diffuses through interstices of the palladium metal lattice structure. Experimental work indicates that the rate of hydrogen transfer through the permeation barriers takes place generally in accordance with the relationship:

$$\text{Rate of H}_2 \text{ Transfer} = \frac{DK}{t} PA$$

where:
$P$ = hydrogen pressure differential across the barrier
$A$ = barrier surface area
$t$ = barrier thickness
$D$ = diffusion coefficient for hydrogen through the barrier
$K$ = solubility constant for hydrogen in the barrier The bearing of temperature on this relationship is taken into account in the respective values for $D$ and $K$ which vary with temperature, and the product $DK$ is conventionally related as the barrier's permeability.

Commercial scale production of high purity hydrogen by the permeation techniques has long been a goal of the gas processing industries. Such processes, however, have been severely hampered by the high cost of the palladium barriers in relation to their useful life and productivity. While hydrogen of very high purity can be obtained by this known method of selective diffusion through palladium barriers, present apparatus limitations, due to the high cost of palladium metal and the low productivity or throughput rates of available barrier equipment, militate against commercial practicality of this hydrogen production method. Palladium barrier diffusers have thus heretofore been limited generally to laboratory and other special uses where relatively small quantities of hydrogen are produced. Use of the method of selective diffusion of hydrogen through hydrogen-permeable palladium barriers on a commercial scale would be highly desirable if some of the more salient difficulties attending the use of palladium barriers could be overcome.

A particular problem concerns the production of effectively thin and sufficiently strong palladium barriers. Until very recently, it has not been possible, according to conventional metal working techniques, to form suitably sized (in area) palladium sheets or foils less than one mil thick, or for that matter, even in the order of one mil thick. Since the rate of diffusion of hydrogen through palladium is inversely proportional to the palladium thickness, thinner foils provide for higher throughput or diffusion rates and permit employment of relatively low flow-sustaining pressure differentials across the barriers. Recent improvements in metal working techniques permit the production of palladium foils of thickness of the order of one-half mil but these are limited to relatively small uniform thickness areas. As to the desideratum of even thinner foils, for example of the order of one-tenth mil thick, the metal working art has been unable to provide as much as even a one square foot area of palladium foil which, during use in a diffuser, can be maintained for a reasonable period of time free from the occurrence of minute orifices, dendritic holes and cracks and other physical distortions occasioned by either routine temperature cyclings attending the diffusion process or the presence of hydrogen or other caused constituents in the feed gas.

Efforts to overcome the physical limitations attending the use of pure palladium diffusion barriers have led researchers to investigate the possibilities of palladium alloys as diffusion barrier materials. It is clear from inspection of the above hydrogen transfer rate relationship that a satisfactory alloy substitute pure palladium should, in addition to meeting the main requirement of enhanced strength and physical stability under operational temperature cycling, be one having a permeability or $DK$ product at least as great and preferably greater than that of pure palladium. U.S. Patent No. 2,773,561 to Hunter teaches that hydrogen diffusion barriers made from palladium alloyed with from 10 to 50 weight percent silver yield higher permeability than pure palladium barriers.

Hunter indicates that the preferred alloy compositions to be used according to his invention are silver-palladium compositions comprising between 10 to 50 percent silver and that, within this range, silver-palladium films comprising 20 to 40 percent silver are even more preferable. Tabulated data in the Hunter patent indicates that a silver-palladium film comprising 27 percent silver yielded increased permeability over pure palladium ranging from 23 percent at a pressure differential of 300 p.s.i.g. and temperature of 550° C. to 72 percent at a pressure differential of 100 p.s.i.g. and temperature of 450° C. From the Hunter teaching it may be deduced that the lower silver concentrations such as 10 percent and below in silver-palladium alloy hydrogen diffusion barriers could not be expected to exhibit the desirable high permeability exhibited by the 20 to 40 percent and particularly the 27 percent silver concentrations in silver-palladium alloy barriers. Barriers containing silver in Hunter's most preferred range however, have been found unsuited to permeator apparatus wherein the barrier foil is held in confined relationship to an underlying supporting substrate because, even though they exhibit a marked increase in permeability over pure palladium barriers, the high silver content expands excessively compared to the palladium content when contacted with hydrogen in a diffusion process. The wrinkling and subsequent tearing of the higher and midrange silver content alloys of palladium-silver appears to be caused not as much by temperature changes as by the introduction and removal of the hydrogen-containing gas after the permeator apparatus has been brought up to operating temperature on a hydrogen-free gas.

During the course of experimental work directed to the evaluation of the hydrogen permeabilities of several alloys of palladium, however, it was noted that unexpectedly high relative permeabilities were exhibited by silver-palladium alloy barriers containing 1.0 weight percent silver.

With this then being the state of the art, I conceived the present invention on the rationale that hydrogen diffusion could be practically effected using silver-palladium alloy barriers containing less than 10 percent silver, and undertook the experimental work and reduction to practice which bore out my concept. The present invention provides an improved hydrogen separation system having a silver-palladium alloy diffusion barrier which not only exhibits desirably high permeability but also increased structural stability over other diffusion barriers under routine temperature cycling and in the presence of hydrogen.

In general, the method of my invention comprehends directing a stream of a multicomponent gas mixture containing hydrogen and at least one other gas to a proximal side of a gas diffusion barrier consisting essentially of an alloy of palladium and from about 1 to less than 10 weight percent silver, converting the hydrogen of the mixture at the proximal side of the barrier into a transportable state for diffusion through the barrier, diffusing the converted hydrogen through the barrier to a distal side thereof, reconverting said hydrogen to its original state at said distal side of said barrier and collecting the hydrogen after its reconversion.

The ensuing disclosure describes my invention with greater particularity and sets forth the details of experimental and development work performed in connection with the invention.

In order to develop general information on the permeability characteristics of alloys of palladium, binary alloys of silver-palladium, gold-palladium, copper-palladium, and nickel-palladium were investigated as diffusion barriers. The alloys tested were in the form of nominally 1 mil thick foils. The actual foil thicknesses which are tabulated were determined both by weight-area measurement and by direct measurement using a mounted dial gauge micrometer device accurate to ±0.01 mils. The foils were supported on porous stainless steel substrates $\frac{1}{16}''$ thick. The tests were performed in laboratory scale diffusion apparatus, the elements of which are within the ken of persons familiar with the art. The barrier surface area contacted was 0.0029 square feet and the test gas used was cylinder hydrogen having a purity of about 99%. Permeability of each barrier tested was measured at a temperature of 350° C. and at two pressure levels scil. 75 p.s.i.g. and 300 p.s.i.g. The results of these tests are shown in Table I below.

Table I

| Run No. | Barrier foil composition (wt. percent) | | Barrier foil thickness, mils | | Permeability | | | |
|---|---|---|---|---|---|---|---|---|
| | | | | | Hydrogen transfer rate at 75 p.s.i.g. upstream pressure—0 p.s.i.g. downstream pressure | | Hydrogen transfer rate at 300 p.s.i.g. upstream pressure—0 p.s.i.g. downstream pressure | |
| | Nominal | Actual | Nominal | Actual | Measured (S.c.f.h.) | (S.c.f.h.)(Mil) / (Sq. Ft.) | Measured (s.c.f.h.) | (S.c.f.h.)(Mil) / (Sq. Ft.) |
| 7 | 100% Pd | 100% Pd | 1 | 1.12 | 0.142 | 55 | 0.433 | 167 |
| 14 | 10% Ag–90% Pd | 10.29% Ag–90.00% Pd | 1 | 1.05 | 0.260 | 94 | 0.811 | 294 |
| 14 Repeat | 10% Ag–90% Pd | 10.64% Ag–89.36% Pd | 1 | 1.03 | 0.23+ | 82+ | | |
| 1 | 27% Ag–73% Pd | 27.18% Ag–73.05% Pd | 1 | 0.92 | 0.298 | 95 | 0.757 | 240 |
| 13 | 40% Ag–60% Pd | 40.05% Ag–59.97% Pd | 1 | 0.93 | 0.113 | 36 | 0.254 | 82 |
| 12 | 52% Ag–48% Pd | 52.30% Ag–47.91% Pd | 1 | 1.24 | 0.012 | 5.1 | 0.027 | 11.6 |
| 11 | 80% Ag–20% Pd | 80.25% Ag–20.09% Pd | 1 | 1.05 | 0.000 | 0 | 0.000 | 0 |
| 6 | 5% Au–95% Pd | 4.9% Au–93.7% Pd | 1 | 1.01 | 0.184 | 64 | 0.514 | 179 |
| 2 | 20% Au–80% Pd | 20.3% Au–78.1% Pd | 1 | 1.02 | 0.159 | 56 | 0.462 | 162 |
| 5 | 40% Au–60% Pd | 39.7% Au–60.6% Pd | 1 | 0.90 | 0.082 | 25.4 | 0.229 | 71 |
| 4 | 55% Au–45% Pd | 54.6% Au–44.8% Pd | 1 | 1.00 | 0.017 | 5.9 | 0.046 | 15.9 |
| 3 | 0.5% B–99.5% Pd | 0.5% B–99.5% Pd | 3 | 2.87 | 0.058 | 57 | 0.161 | 159 |
| 8 | 10% Cu–90% Pd | 9.8% Cu–90.1% Pd | 1 | 0.97 | 0.093 | 31 | 0.246 | 82 |
| 9 | 40% Cu–60% Pd | 38.7 Cu–60.1% Pd | 1 | 1.03 | 0.208 | 74 | 0.506 | 180 |
| 10 | 10% Ni–90% Pd | 9.8% Ni–90.6% Pd | 1 | 1.05 | 0.034 | 12.3 | 0.089 | 32 |

In the table, s.c.f.h. means standard cubic feet per hour, referred to atmospheric pressure.

In the series of tests according to Table I above, the diffusion cell temperature was held to within ±½° C. of 350° C. throughout all runs and the upstream pressure was held to within ±0.5 p.s.i.g. A run at any one set of conditions was assumed to be finished when the measured hydrogen diffusion rate remained constant within ±0.001 s.c.f.h for a period of three to four days. Before and after each test run, leak tests were made with nitrogen to confirm the physical integrity of the barriers.

An examination of the tabulated data indicates that while those silver-palladium alloys near and above the higher end of Hunter's range of silver concentration perform as predicted, the alloy of palladium and 10 weight percent silver exhibits far greater permeability than Hunter's teaching indicates and in fact a greater permeability increase over pure palladium than Hunter's 27 percent silver palladium-silver alloy at the 300 p.s.i.g. pressure differential. At 75 p.s.i.g. pressure differential the hydrogen diffusion rate of the alloy of palladium and 10 weight percent silver is 83 percent greater than that of pure palladium for one run and 62 percent greater for another. At the 300 p.s.i.g. pressure differential the hydrogen diffusion rate of the 10 weight percent silver and palladium alloy is 87.5 percent greater than that of pure palladium while the hydrogen diffusion rate of the alloy of palladium and 27 weight percent silver is only 75 percent greater than that of pure palladium.

Further experiments were performed to evaluate the permeability characteristics of only silver-palladium alloy diffusion barriers containing various silver weight percentages, particularly in the range below 10 weight percent silver. The apparatus used and the test conditions were the same as those employed in obtaining the data posed in Table I above and the results of these experiments are tabulated below in Table II, with certain of the Table I data reproduced for purposes of comparison. Each run was of 1½ to 2 weeks duration.

had to be discarded. Tests were continued on the pure palladium foils and the 5 weight percent silver-palladium alloy foils. Over operating pressures of from 100 to 200 p.s.i.g. and temperatures of from 350° C. to 450° C. the Table II

| Run No. | Palladium-silver alloy barrier foil composition (wt. percent) | | Foil thickness mils | | Permeability | | | |
|---|---|---|---|---|---|---|---|---|
| | | | | | Hydrogen transfer rate at 75 p.s.i.g. upstream pressure—0 p.s.i.g. downstream pressure | | Hydrogen transfer rate at 300 p.s.i.g. upstream pressure—0 p.s.i.g. downstream pressure | |
| | Nominal | By analysis | Nominal | Actual | Measured (S.c.f.h.) | (S.c.f.h.) (Mil) / (Sq. Ft.) | Measured (S.c.f.h.) | (S.c.f.h.) (Mil) / (Sq. Ft.) |
| 7 | 0% Ag-100% Pd | 0% Ag-100% Pd | 1 | 1.12 | 0.142 | 55 | 0.433 | 167 |
| 27 | 1% Ag-99% Pd | 0.73% Ag-99.52% Pd | 1 | 0.89 | 0.223 | 68 | 0.644 | 198 |
| 26 | 3% Ag-97% Pd | 3.06% Ag-97.21% Pd | 1 | 0.96 | 0.246 | 81 | 0.707 | 234 |
| 22 | 5% Ag-95% Pd | 4.63% Ag-95.66% Pd | 1 | 0.94 | 0.291 | 94 | 0.829 | 269 |
| 23 | 8% Ag-92% Pd | 7.62% Ag-92.22% Pd | 1 | 0.94 | 0.287 | 93 | 0.868 | 282 |
| 28 | 10% Ag-90% Pd | 9.55% Ag-80.93% Pd | 1 | 1.04 | 0.265 | 95 | 0.816 | 293 |
| 1 | 27% Ag-73% Pd | 25.49% Ag-72.76% Pd | 1 | 0.92 | 0.298 | 95 | 0.757 | 240 |
| 13 | 40% Ag-60% Pd | 39.32% Ag-59.74% Pd | 1 | 0.93 | 0.113 | 36 | 0.254 | 82 |
| 12 | 52% Ag-48% Pd | 51.24% Ag-47.63% Pd | 1 | 1.24 | 0.012 | 5 | 0.027 | 12 |
| 11 | 80% Ag-20% Pd | 79.26% Ag-20.03% Pd | 1 | 1.05 | 0.000 | 0 | 0.000 | 0 |

These data show that low silver content silver-palladium alloys are highly permeable to hydrogen. The addition of only 1 weight percent silver to palladium effects a permeability increase of about 25 percent over pure palladium. An additional silver is alloyed with palladium, hydrogen permeability increases and reaches a maximum of about 1.7 times that of pure palladium at approximately 5 weight percent silver. Barriers containing from 5 to about 27 weight percent silver alloyed with palladium exhibit fairly similar permeability characteristics and permeability begins to decrease with barriers containing more than 27 weight percent silver. Most important in respect of the palladium-silver alloy barriers containing less than 10 weight percent silver however, is that in addition to exhibiting permeabilities comparable to the preferred range higher silver content barriers (and in all instances higher than that of pure palladium) they do not suffer the excessive expansion and contraction in the presence of hydrogen which characterizes the higher silver content palladium-silver alloys and renders them generally unsuitable for use in continuous production hydro-hydrogen separation techniques.

Following the aforedescribed experimental work, comparison tests on pure palladium barriers, 27 weight percent silver, 73 weight percent palladium alloy barriers and 5 weight percent silver—95 weight percent palladium alloy barriers were conducted on larger scale apparatus. The diffusion barrier foils used were normally 1 mil thick, generally rectangular in shape and were arranged on back-to-back porous iron substrates separated by perforated plates to define a sandwich-like structure or "drum" having connecting interior voids. Each such assembly was held together by a frame member which defined a leak-tight edge around the outwardly facing barrier foils. Several drums were arranged in stacked spaced relationship in an enclosed chamber. Hydrogen collection conduits were connected through the respective frames into each of the spaces betwen the back-to-back barriers and manifolded out through the enclosed chamber's walls. A by-product gas source containing hydrogen, methane and other gas constituents was fed continuously into the chamber after preheating and gross filtering by conventional means and high purity hydrogen collected, measured, analyzed and vented. The working surface of each barrier foil was approximately 1.2 square feet or 2.4 square feet per drum and the foils were tested in stacks of five or six drums for each type of foil. Barrier elements comprising the alloy foil of 27 weight percent silver and 73 weight percent palladium deteriorated and failed after being brought up to operating temperature and exposed to the hydrogen-containing feedstock stream and relative permeability of the 5 weight percent silver-palladium alloy foil barriers was found to be 30 to 50 percent greater than that of the pure palladium foils for continuous operating periods of up to several months. The barriers were also examined after each shut-down and these 5 weight percent silver-palladium alloy foil barriers were found to exhibit no extraordinary distortion or change in appearance.

From the foregoing disclosure it will be apparent to persons familiar with the art that I have invented an improved method and apparatus for the separation and purification of hydrogen from gas mixtures containing hydrogen and at least one other gas or from multicomponent gas mixtures containing hydrogen. While, in the preferred form, my invention comprehends the use of hydrogen diffusion barrier foils consisting essentially of an alloy of palladium and about 5 weight percent silver, suitable barriers may also be made from silver-palladium alloys wherein silver is present in from about 1 to less than 10 weight percent of the alloy.

The foregoing disclosure and the description of the method and apparatus the present invention is posed to make for understanding of my concept, experimental work and reduction to practice and should not be construed in any limiting sense, the invention being defined by the scope of the appended claims.

What is claimed is:

1. A method for separating hydrogen from a gas mixture containing hydrogen and at least one other gas which method comprises the steps of directing a stream of the gas mixture to a gas diffusion barrier having a foil layer consisting essentially of an alloy of palladium and silver having from 5 weight percent to 8 weight percent silver; maintaining a hydrogen pressure differential of substantially 300 p.s.i.g. across said barrier and a temperature of substantially 350° C. at said barrier, whereby hydrogen of the mixture is converted to a diffusible state, diffused through the foil layer of said barrier and then reconverted to its original state, separated from the gas mixture.

2. A method for separating hydrogen from a gas mixture containing hydrogen and at least one other gas which method comprises the steps of directing a stream of the gas mixture to a gas diffusion barrier having a foil layer consisting essentially of an alloy of substantially 95 weight percent palladium and substantially 5 weight percent silver; maintaining a hydrogen pressure differential of substantially 300 p.s.i.g. across said barrier and a temperature of substantially 350° C. at said barrier, whereby hydrogen of the mixture is converted to a diffusible state, diffused through the foil layer of said barrier and then reconverted to its original state, separated from the gas mixture.

3. A method for separating hydrogen from a gas mixture containing hydrogen and at least one other gas which method comprises the steps of directing a stream of the gas mixture to a gas diffusion barrier having a foil layer consisting essentially of an alloy of substantially 92 weight percent palladium and substantially 8 weight percent silver; maintaining a hydrogen pressure differential of substantially 300 p.s.i.g. across said barrier and a temperature of substantially 350° C. at said barrier, whereby hydrogen of the mixture is converted to a diffusible state, diffused through the foil layer of said barrier and then reconverted to its original state, separated from the gas mixture.

References Cited by the Examiner
UNITED STATES PATENTS

| | | | |
|---|---|---|---|
| 2,299,114 | 10/1942 | Sivel et al. | 75—172 |
| 2,384,502 | 9/1945 | Streicher | 75—172 |
| 2,773,561 | 12/1956 | Hunter | 55—16 |
| 2,824,620 | 2/1958 | De Rosset | 55—16 |
| 3,155,467 | 11/1964 | Musachino-shi et al. | 55—16 |

REUBEN FRIEDMAN, *Primary Examiner.*